(12) United States Patent
Yamamoto

(10) Patent No.: US 8,267,820 B2
(45) Date of Patent: Sep. 18, 2012

(54) BICYCLE CHAIN TENSIONER

(75) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 408 days.

(21) Appl. No.: 12/262,245

(22) Filed: Oct. 31, 2008

(65) Prior Publication Data
US 2010/0113200 A1    May 6, 2010

(51) Int. Cl.
*F16H 7/12* (2006.01)
(52) U.S. Cl. .......................................... 474/133; 474/80
(58) Field of Classification Search ............... 474/113, 474/133, 80, 82
See application file for complete search history.

(56) References Cited

U.S. PATENT DOCUMENTS

| | | | | |
|---|---|---|---|---|
| 6,015,360 A * | 1/2000 | Chang | ............................ | 474/80 |
| 2002/0098933 A1 | 7/2002 | Kline | | |
| 2006/0240920 A1* | 10/2006 | Urabe | ............................ | 474/80 |
| 2010/0264622 A1* | 10/2010 | Bastianen | ................. | 280/281.1 |

FOREIGN PATENT DOCUMENTS

| | | | |
|---|---|---|---|
| JP | 08002473 A | * | 1/1996 |
| WO | WO 2005021369 A1 | * | 3/2005 |
| WO | WO 2009041820 A1 | * | 4/2009 |

OTHER PUBLICATIONS

Sicklines NPL Reference Jun. 2007 (See Sicklines NPL reference attached).*

* cited by examiner

*Primary Examiner* — Michael Mansen
*Assistant Examiner* — Juan Campos, Jr.
(74) *Attorney, Agent, or Firm* — Global IP Counselors, LLP

(57) ABSTRACT

A bicycle chain tensioner is provided with a bracket, a tensioner arm, a securing position adjustment mechanism and a chain engaging member. The bracket has a bicycle axle mounting portion and an arm attachment portion. The tensioner arm is adjustably secured to the arm attachment portion of the bracket. The securing position adjustment mechanism selectively fixes the tensioner arm with respect to the bracket in one of a plurality of the securing positions. The chain engaging member is attached to the tensioner arm.

7 Claims, 9 Drawing Sheets

BICYCLE CHAIN TENSIONER

BACKGROUND OF THE INVENTION

1. Field of the Invention

This invention generally relates to a tension applying device. More specifically, the present invention relates to a bicycle chain tensioner for applying tension to a bicycle chain.

2. Background Information

In a bicycle, a chain typically runs between a front sprocket and a rear sprocket. Over time, the chain is gradually stretched with use and may fall off the sprockets. In order to prevent this from happening, a mechanism for applying tension to the chain is often used. In some bicycles, a rear derailleur is used as a shifting device to shift gears. The typical rear derailleur inherently includes a chain tensioning function. However, on the other hand, when an internal shift hub or the like is used to shift gears, there is no chain tension applying function provided by the shifting device. In such a case, a chain tension applying device is added to the bicycle for applying tension to the chain.

A conventionally known chain tension applying device is pivotally mounted to the bicycle with a movable arm supporting a tension sprocket at its free end. The chain tension applying device also includes a coil spring that biases the tension sprocket into engagement with the chain.

SUMMARY OF THE INVENTION

One object of the present invention is to provide a bicycle chain tensioner that applies tension to the chain without using a chain tension spring.

The foregoing objects can basically be attained by providing a bicycle chain tensioner that comprises a bracket, a tensioner arm, a securing position adjustment mechanism and a chain engaging member. The bracket has a bicycle axle mounting portion and an arm attachment portion. The tensioner arm is adjustably secured to the arm attachment portion of the bracket. The securing position adjustment mechanism selectively fixes the tensioner arm with respect to the bracket in one of a plurality of the securing positions. The chain engaging member is attached to the tensioner arm.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
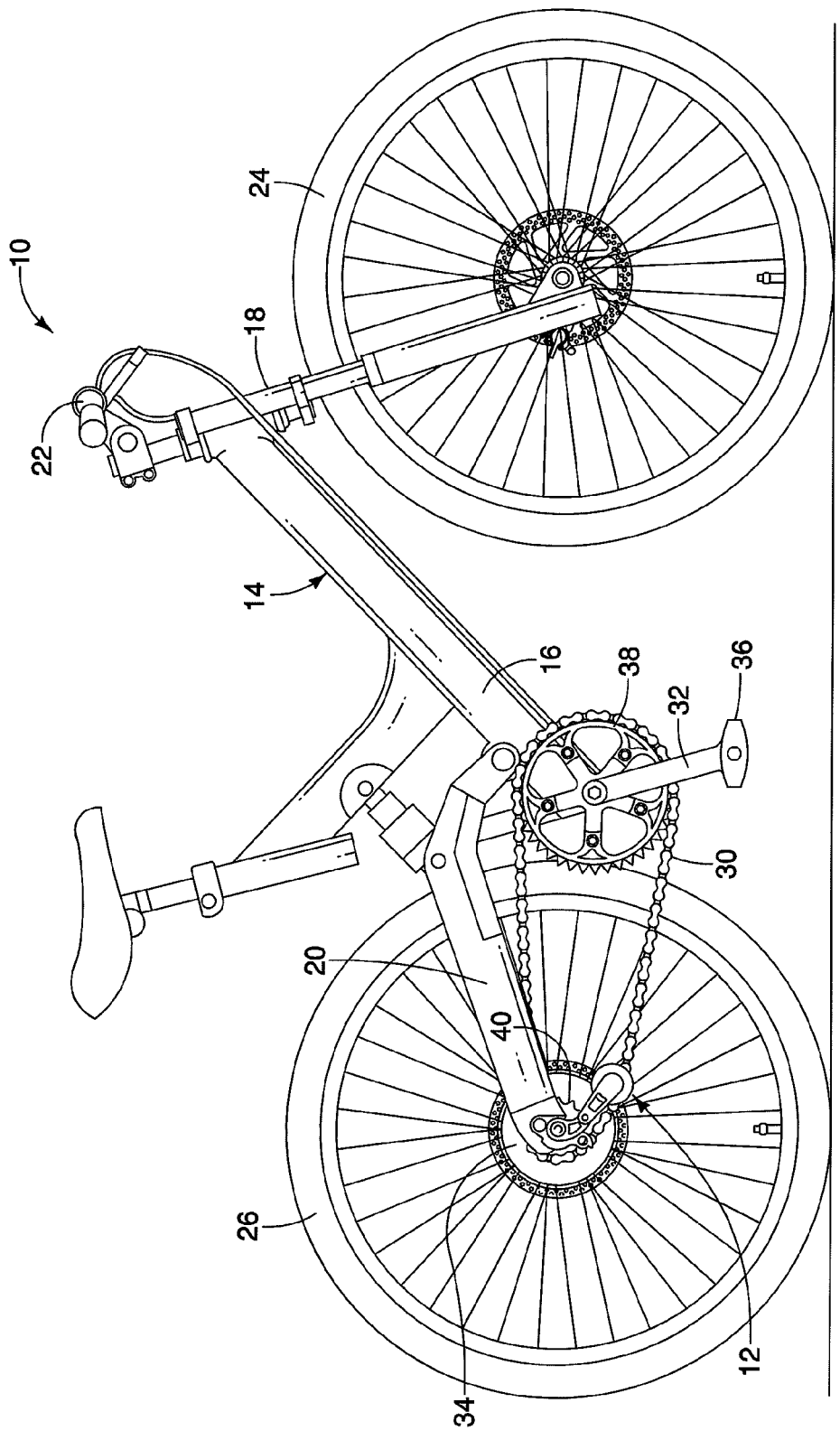
FIG. 1 is a side elevational view of a bicycle equipped with a bicycle chain tensioner in accordance with one embodiment.

Referring initially to FIG. 1, a suspension bicycle 10 is illustrated that is equipped with a bicycle chain tensioner 12 in accordance with an illustrated embodiment. Of course, the bicycle chain tensioner 12 can also be used with non-suspension bicycles such as a bicycle with a conventional frame having a pair of stationary chain stays.

The bicycle 10 illustrated in FIG. 1 includes, among other things, a frame 14 having a main frame body 16, a suspension fork 18 and a rear swing arm 20. The suspension fork 18 has a handle 22 secured to its upper end and a front wheel 24 rotatably secured to its upper end lower end. The rear swing arm 20 is pivotally mounted at its front end to the main frame body 16, and has a rear wheel 26 rotatably secured to its rear end. The rear swing arm 20 includes a hanger 28 for attaching the rear wheel 26. The bicycle 10 includes a drive train including a chain 30, a front gear crank 32 and an internal shift hub 34, which is part of the rear wheel 26. The front gear crank 32 has a pair of pedals 36 (only one shown) and a front sprocket 38 that engages the chain 30. The internal shift hub 34 in a conventional component that has a rear sprocket 40 that engages the chain 30. The internal shift hub 34 includes a rear hub axle 42 that is mounted in a slot of the hanger 28.

Figure 2:
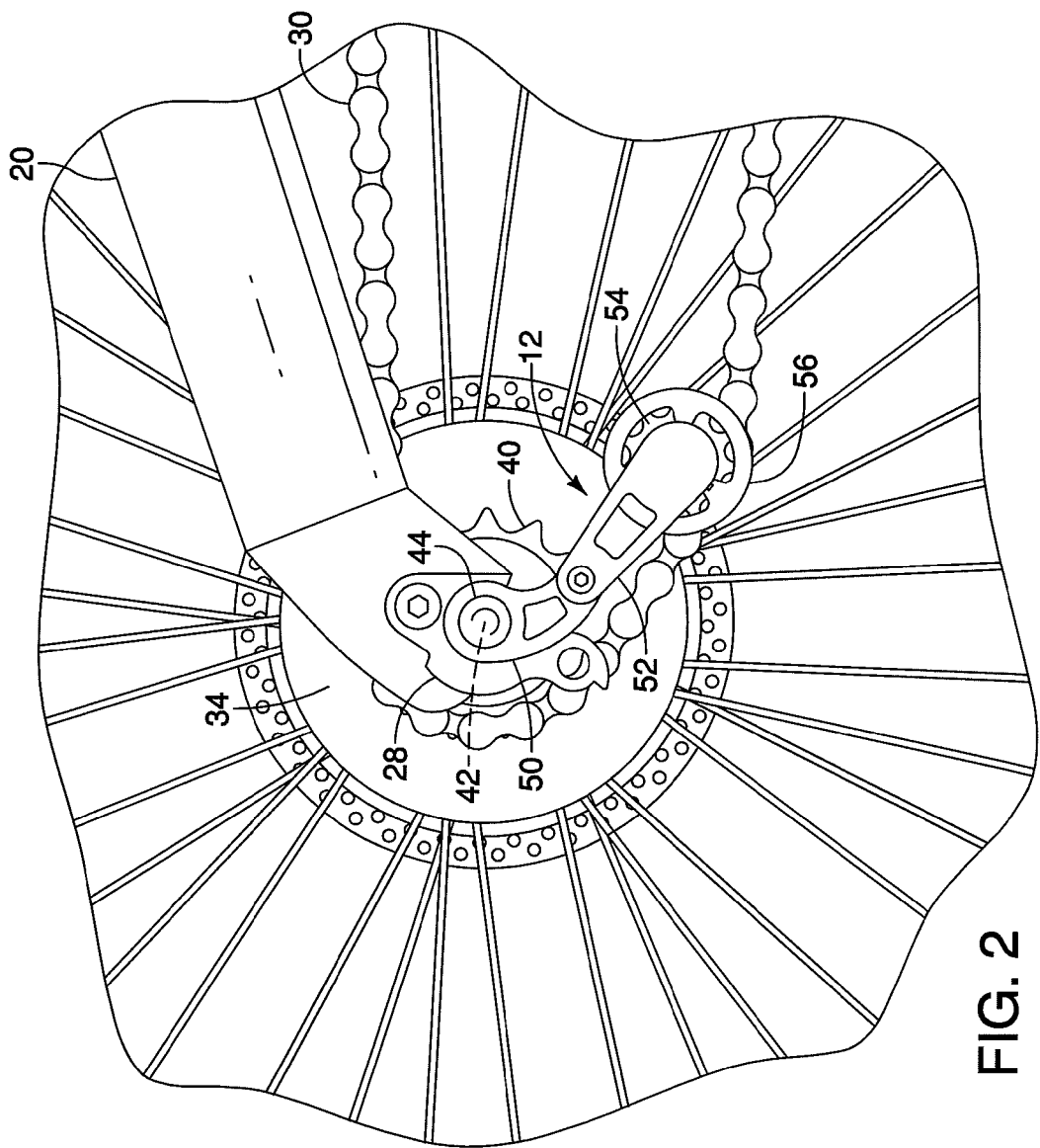
FIG. 2 is an enlarged side elevational view of a rear portion of the bicycle showing the bicycle chain tensioner in a first operating position.
Figure 3:
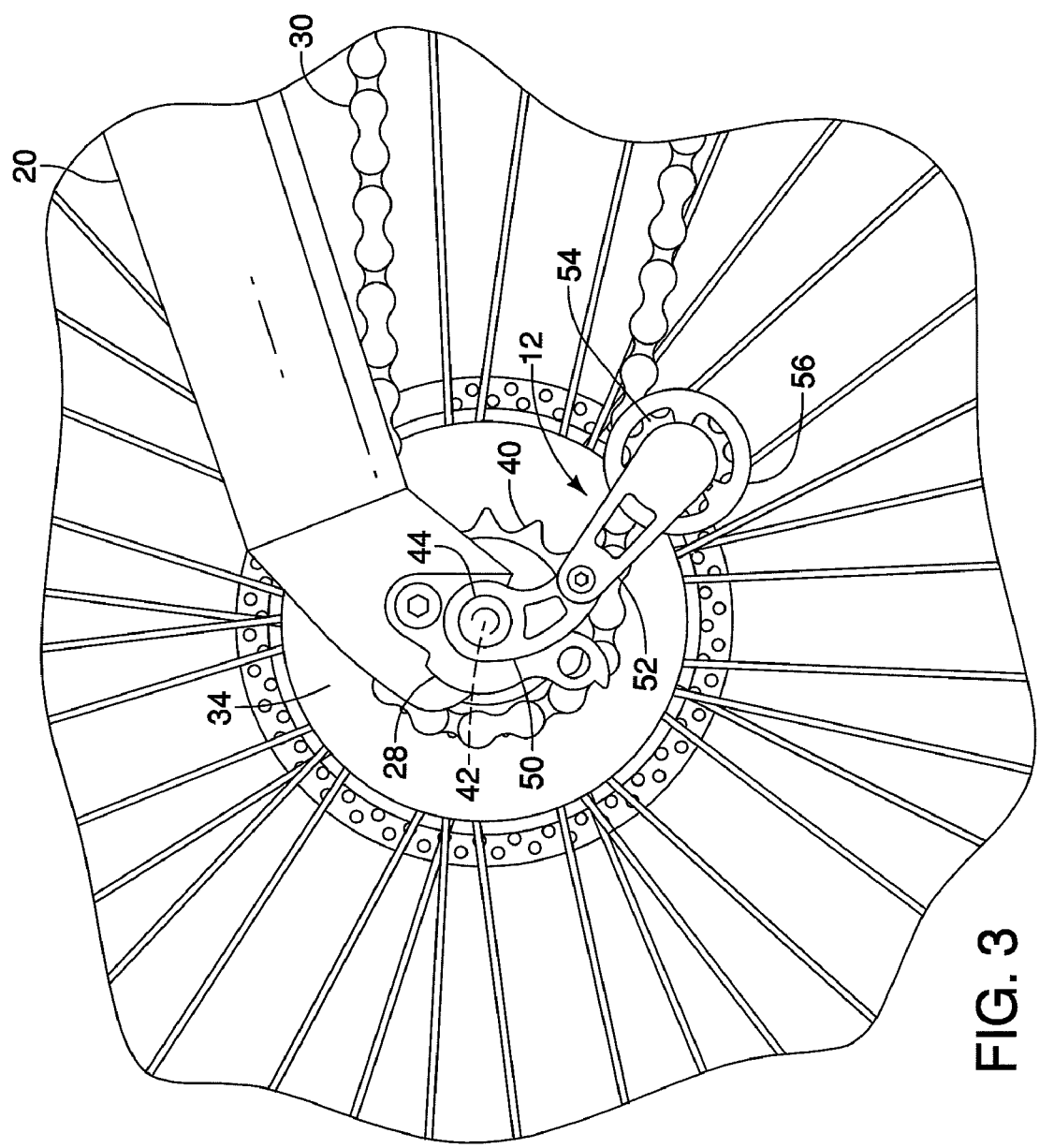
FIG. 3 is an enlarged side elevational view of a rear portion of the bicycle showing the bicycle chain tensioner in a second operating position.
Figure 4:
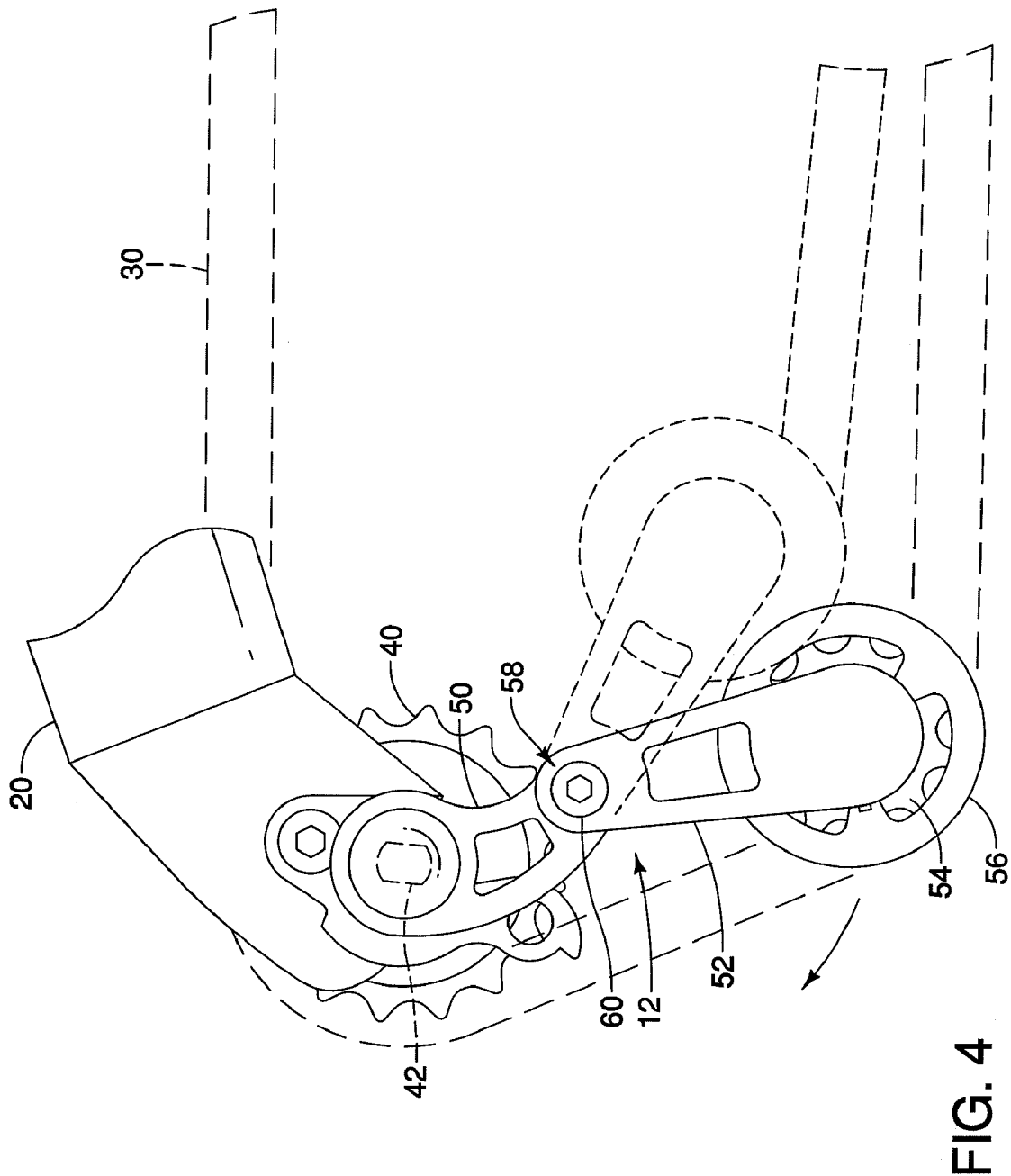
FIG. 4 is an enlarged side elevational view of the bicycle chain tensioner showing in an initial tensioning position in broken lines prior to the chain stretching and showing an adjusted tensioning position in full lines after the chain has stretched.
Figure 6:
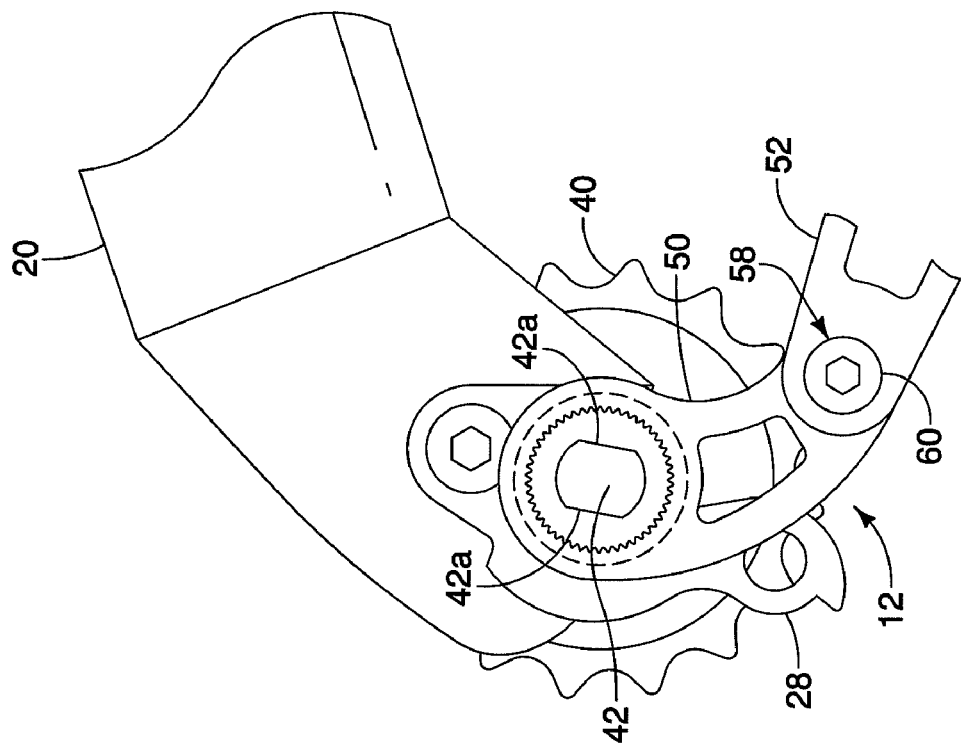
FIG. 6 is an enlarged side elevational view of a rear portion of the bicycle frame of the bicycle of FIG. 1 with the rear internally geared hub mounted to the frame and the bicycle chain tensioner mounted to the rear axle.
Figure 5:
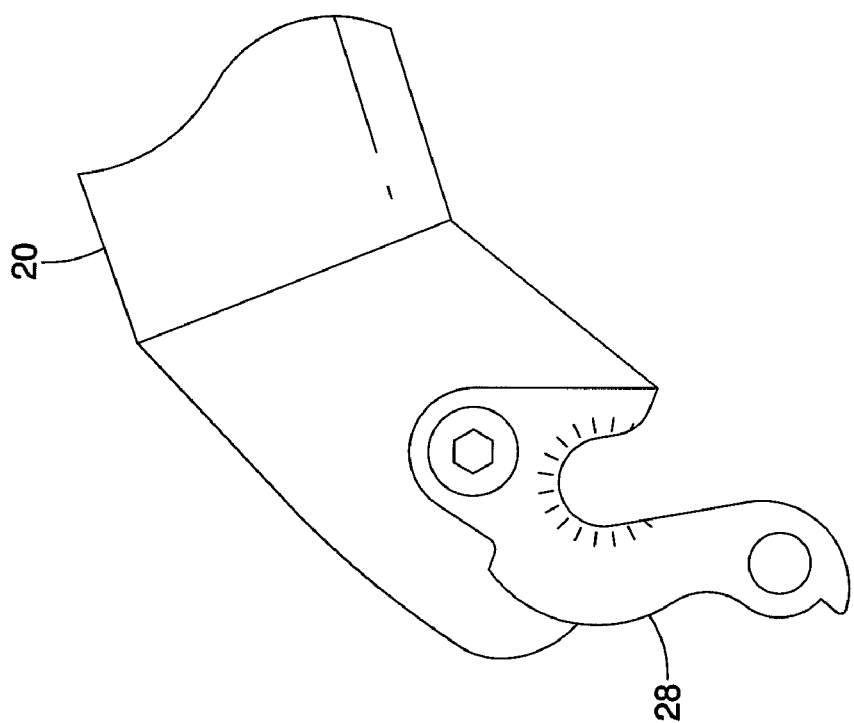
FIG. 5 is an enlarged side elevational view of a rear portion of the bicycle frame of the bicycle of FIG. 1 with the rear internally geared hub and the bicycle chain tensioner removed
Figure 7:
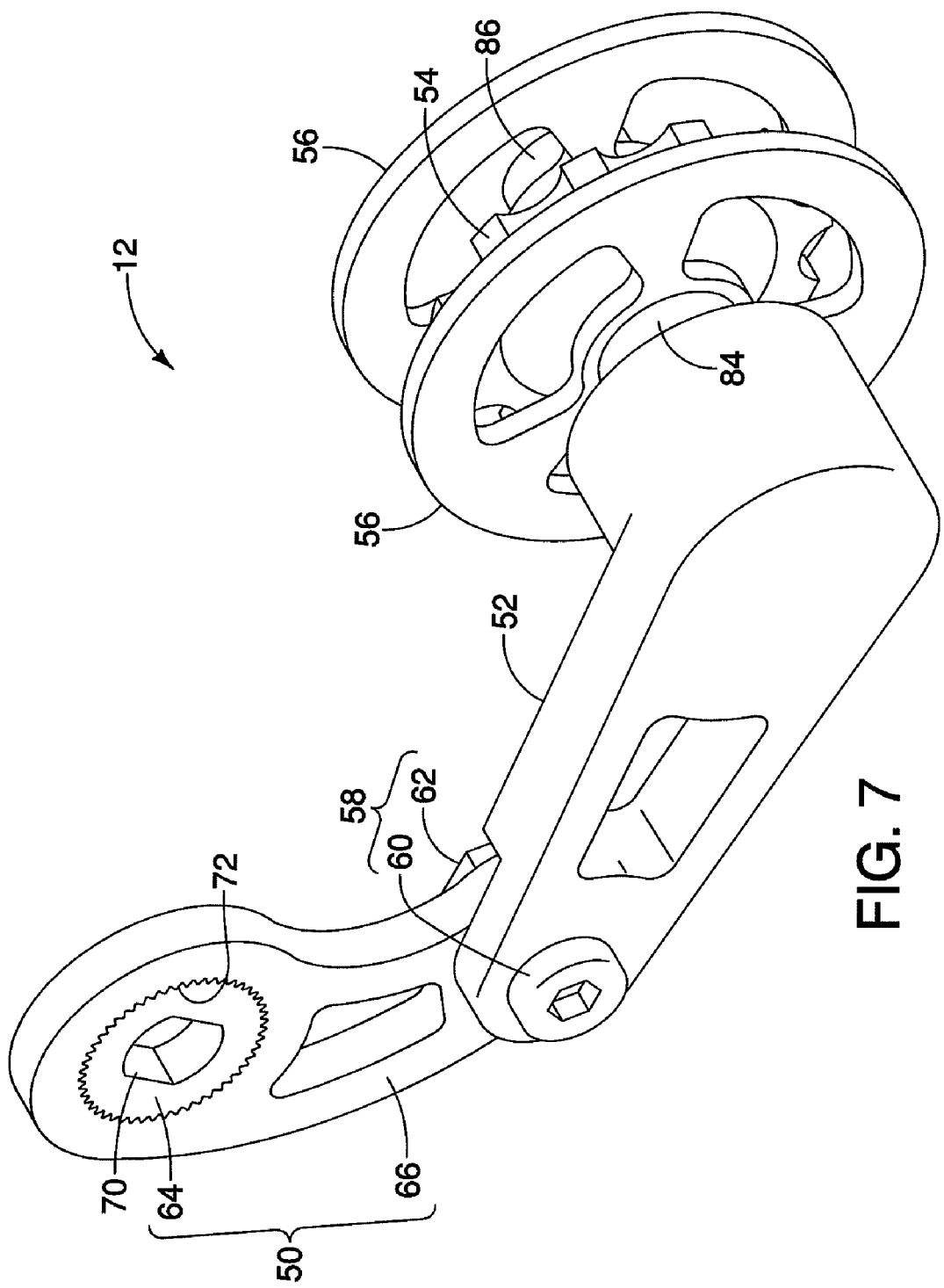
FIG. 7 is a perspective view of the bicycle chain tensioner prior to being mounted to the axle of the rear internally geared hub.
Figure 8:
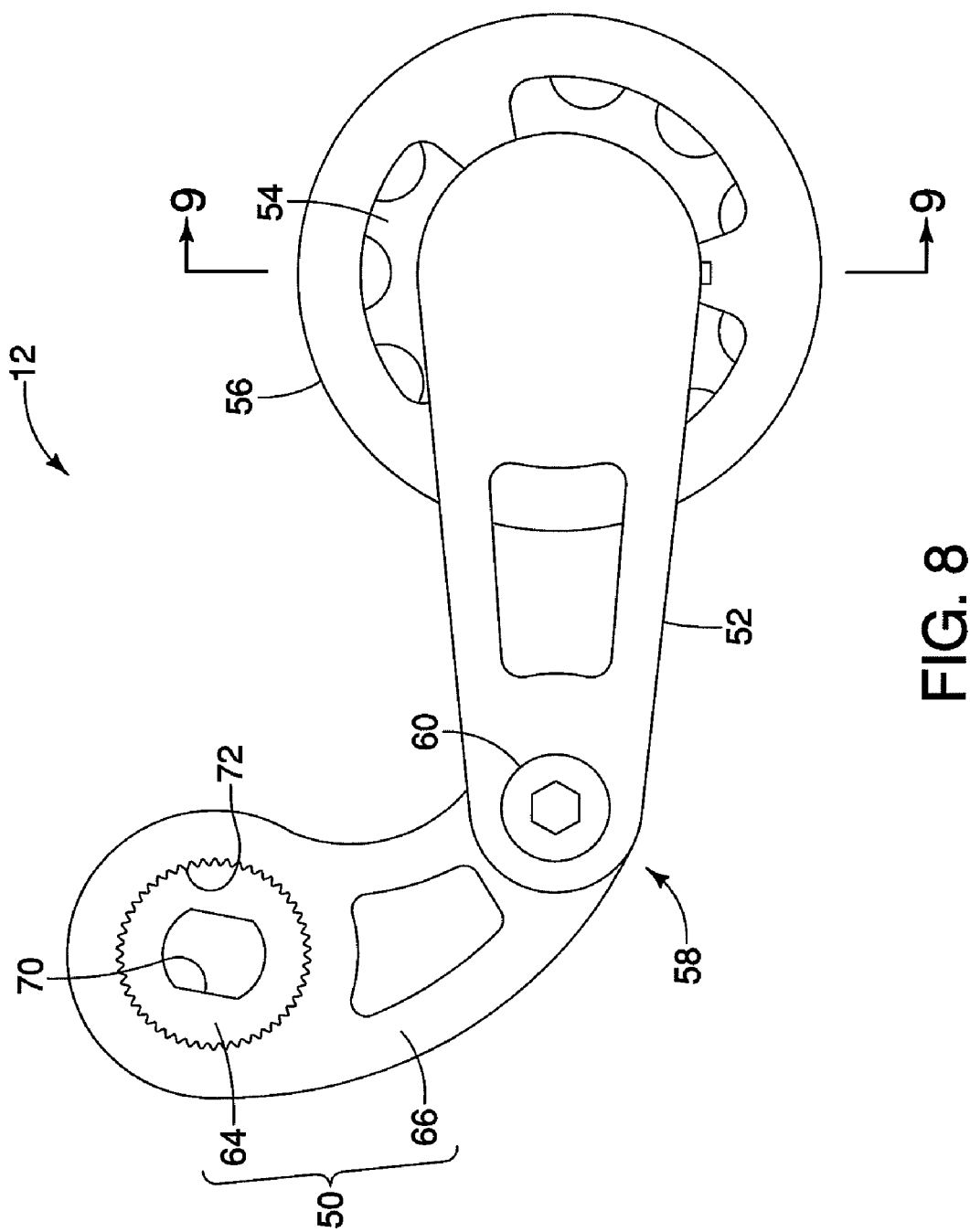
FIG. 8 is a side elevational view of the bicycle chain tensioner prior to being mounted to the axle of the rear internally geared hub.
Figure 11:
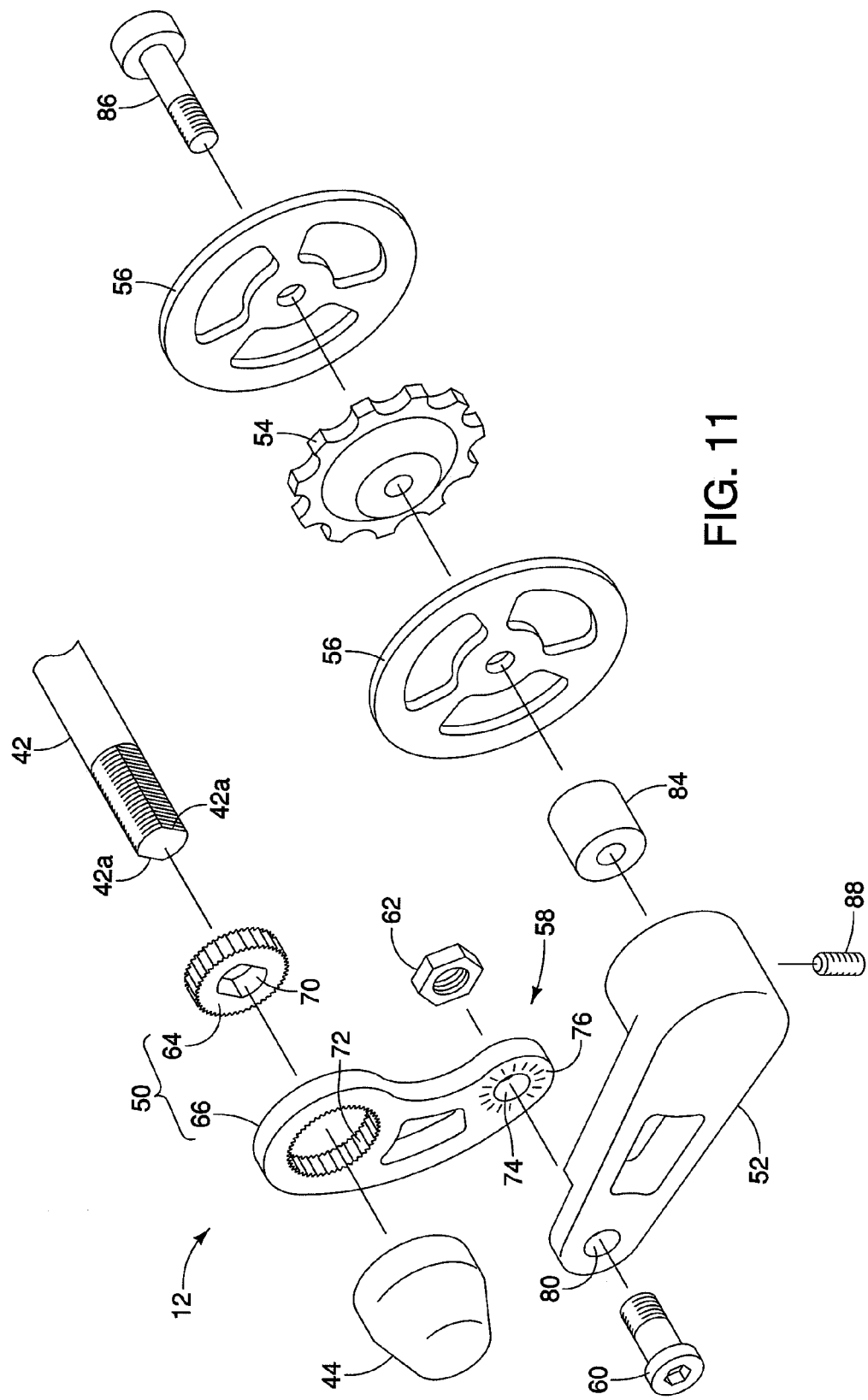
FIG. 11 is an exploded perspective view of the bicycle chain tensioner.

As seen in FIGS. 2 and 3, the bicycle chain tensioner 12 is mounted on one end of the rear hub axle 42 of the internal shift hub 34 and then secured to the end of the rear hub axle 42 by a nut 44. The bicycle chain tensioner 12 can be mounted in a first operating position such that a lower side of the bicycle chain tensioner 12 engages the chain 30 as seen in FIG. 2. Alternatively, the bicycle chain tensioner 12 can be mounted in a first operating position such that an upper side of the bicycle chain tensioner 12 engages the chain 30 as seen in FIG. 3. The rear hub axle 42 has a non-circular outer peripheral surface, which in the illustrated embodiment includes a pair of parallel flat surfaces 42a as seen in FIGS. 6 and 11.

As best seen in FIGS. 4 and 7 to 11, the bicycle chain tensioner 12 basically includes an attachment bracket 50, a tensioner arm 52, a tension pulley 54 and a pair of drop-off prevention plates 56. The attachment bracket 50 is configured to be secured on the rear hub axle 42 by the nut 44. The tensioner arm 52 has a first end adjustably coupled to the attachment bracket 50 by a securing position adjustment mechanism 58 that selectively fixes the tensioner arm 52 with respect to the attachment bracket 50 in one of a plurality of the securing positions. In the illustrated embodiment, the securing position adjustment mechanism 58 includes a fixing screw 60 and a fixing nut 62. The tensioner arm 52 has a second end rotatably supporting the tension pulley 54 and the drop-off prevention plates 56. The tension pulley 54 constitutes a chain engaging member that engages the chain 30 for applying a tension force to the chain 30.

In the illustrated embodiment, the tension pulley 54 has a fixed rotational axis that remains at a fixed distance with respect to the bicycle axle mounting portion of the attachment bracket 50 when the tensioner arm 52 is fixed with respect to the attachment bracket 50 in one of a plurality of the securing positions by the securing position adjustment mechanism 58. This situation occurs since the fixing screw 60 and the fixing nut 62 applies a pressing force that presses the attachment bracket 50 and the tensioner arm 52 together. Thus, the attachment bracket 50 and the tensioner arm 52 are prevented from rotating due to frictional engagement of the interfaces between the attachment bracket 50 and the tensioner arm 52. This frictional engagement is such that the attachment bracket 50 and the tensioner arm 52 will not move relative to each other during riding. The bicycle chain tensioner 12 is free of any spring or biasing member to press the tension pulley 54 against the chain 30.

The attachment bracket 50 is a hard rigid member that is preferably made of metal or a high strength non-metallic material. As best seen in FIG. 11, the attachment bracket 50 has a bicycle axle mounting portion 64 and an arm attachment portion 66. The bicycle axle mounting portion 64 and the arm attachment portion 66 are constructed of metallic materials, which can be the same or different as needed and/or desired. While the attachment bracket 50 is a two piece member in the illustrated embodiment, the attachment bracket 50 can be a one-piece, unitary member, if needed and/or desired.

The bicycle axle mounting portion 64 is an axle mounting member or washer that is separate from the arm attachment portion 66 of the attachment bracket 50. The bicycle axle mounting portion 64 has a non-circular axle mounting hole 70 defined by a pair flat parallel sides that are connected at their ends by a pair of curved surfaces. The non-circular axle mounting hole 70 constitutes an anti-rotation structure that engages the rear hub axle 42 to prevent relative rotation between the rear hub axle 42 and the attachment bracket 50. The bicycle axle mounting portion 64 preferably has a serrated edge that mates with a fixing aperture 72 of the arm attachment portion 66. In particular, the fixing aperture 72 of the arm attachment portion 66 has corresponding serrations that mate with the serrated edge of the bicycle axle mounting portion 64. Preferably, a press-fit connection is formed between the serrated edge of the bicycle axle mounting portion 64 and the serrations of the fixing aperture 72. The term press fitted as used herein refers to fastening two parts together by friction after the parts are longitudinally pushed together, rather than by any other means of fastening. More preferably, the friction of the press-fit connection that holds the two parts together is preferably increased by compression of one part against the other, which relies on the tensile and compressive strengths of the materials that the two parts are made from. With this arrangement, when the rear wheel 26 is detached from the rear swing arm 20, the bicycle chain tensioner 12 is also detached from the frame 14.

The arm attachment portion 66 is provided with a fixing bore 74 that receives the fixing screw 60 therethrough. Thus, in the illustrated embodiment, the fixing bore 74 is a non-threaded hole. However, the fixing bore 74 can be a threaded hole, if needed and/or desired. The arm attachment portion 66 is also provided with a series of small ridges or grooves that extend radially outwardly from the periphery of the fixing bore 74 to form a knurled or ribbed surface 76. This ribbed surface 76 of the attachment bracket 50 engages a mating knurled or ribbed surface on the tensioner arm 52. While both of the tensioner arm 52 and the arm attachment portion 66 of the attachment bracket 50 includes a ribbed surface in the illustrated embodiment, only at least one of the tensioner arm 52 and the arm attachment portion 66 of the attachment bracket 50 can includes the ribbed surface, if needed and/or desired. The ribbed surface 76 of the attachment bracket 50 and the mating ribbed surface on the tensioner arm 52 prevent to relative rotational movement of the tensioner arm 52 with respect to the attachment bracket 50 around of the fixing screw 60.

Figure 9:
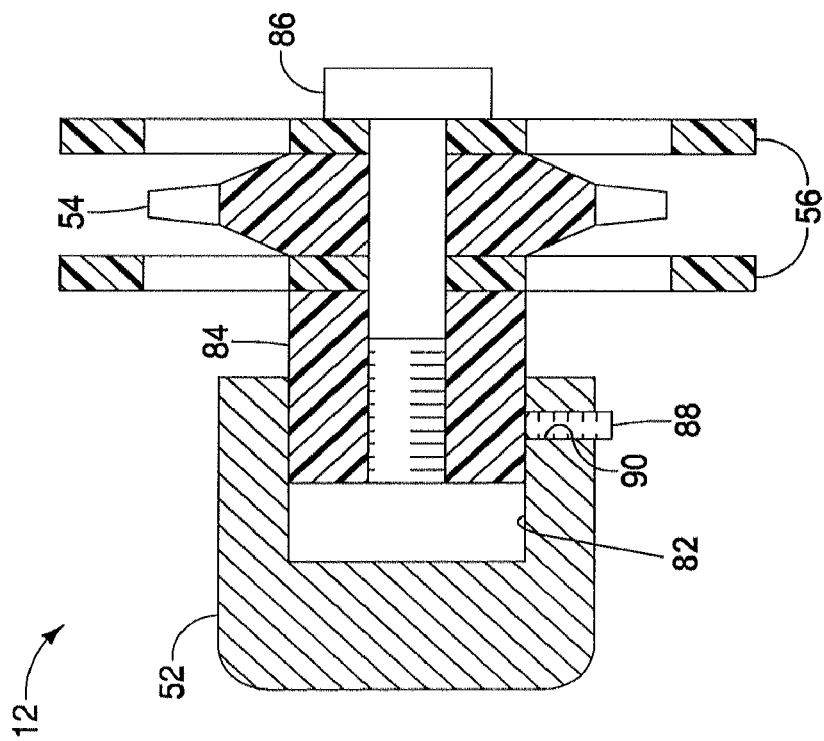
FIG. 9 is a cross sectional view of the bicycle chain tensioner as seen along section line 9-9 of FIG. 8, with the tension pulley in a first alignment position.
Figure 10:
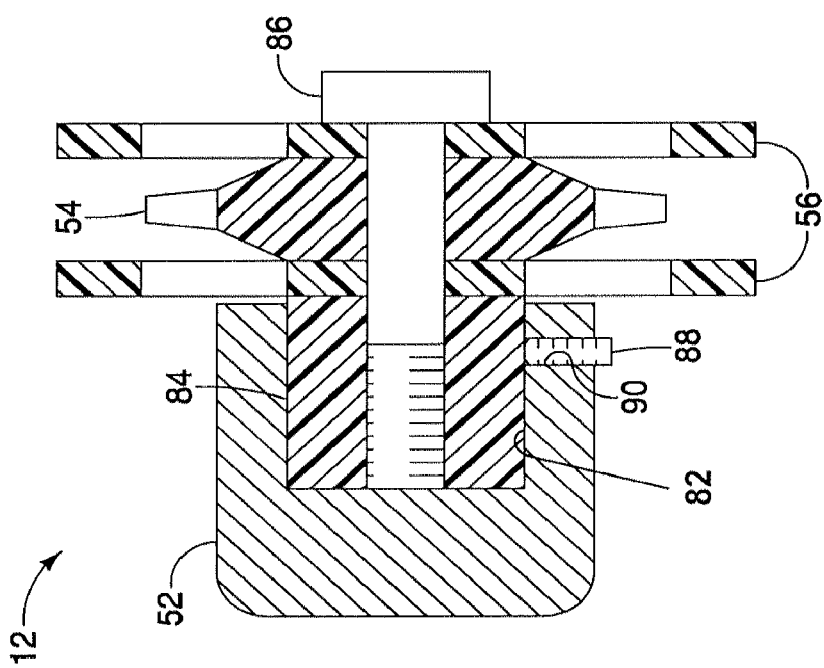
FIG. 10 is a cross sectional view of the bicycle chain tensioner, similar to FIG. 9, but with the tension pulley in a second alignment position.

As seen in FIGS. 9 to 11, the tensioner arm 52 is a hard rigid member that is preferably made of metal or a high strength non-metallic material. The tensioner arm 52 is adjustably secured to the arm attachment portion of the attachment bracket 50 by the fixing screw 60 and the fixing nut 62 as mentioned above. In particular, a first end of the tensioner arm 52 is has a fixing bore 80 that receives the fixing screw 60 therethrough. Thus, in the illustrated embodiment, the fixing bore 80 is a non-threaded hole. However, the fixing bore 80 can be a threaded hole, if needed and/or desired. A second end of the tensioner arm 52 is provided with a blind bore 82 for attaching the tension pulley 54 and the drop-off prevention plates 56 to the tensioner arm 52. The drop-off prevention plates 56 are disposed on opposite axial sides of the tension pulley 54 for aiding in maintaining the chain on the tension pulley 54.

The fixing screw 60 is disposed in the coaxial fixing bores 74 and 80 formed in the tensioner arm 52 and the arm attachment portion 66 of the attachment bracket 50 with the fixing screw 60 defining an adjustment axis such that the tensioner arm 52 is pivotally attached to the arm attachment portion 66 of the attachment bracket 50 when the fixing screw 60 is loosened and such that the tensioner arm 52 is fixed to the arm attachment portion 66 of the attachment bracket 50 in one of the securing positions.

As seen in FIGS. 9 to 11, a pulley adjustment boss 84 is disposed in the bore 82 of the tensioner arm 52. The pulley adjustment boss 84 includes a threaded hole for threadedly receiving a pulley axle 86, which is in the form of a bolt. The pulley axle 86 rotatably supports the tension pulley 54 and the drop-off prevention plates 56. A set screw 88 is threaded into a threaded hole 90 that intersects with the bore 82. The set screw 86 contacts the outer peripheral surface of the pulley adjustment boss 84 to adjustably secure the pulley adjustment boss 84 within the bore 82 of the tensioner arm 52. In other words, the tension pulley 54 can be adjustably positioned in a plurality of alignment positions with respect to a chain line of the chain 30. FIG. 9 shows the tension pulley 54 in a first alignment position, while FIG. 10 shows the tension pulley 54 in a second alignment position. The pulley adjustment boss 84 and the set screw 86 cooperate together to form a pulley adjustment arrangement that adjustably connects the tension pulley 54 to the tensioner arm 52 to selectively hold the tension pulley 54 at one of a plurality of lateral rotation (alignment) positions such that a center rotational plane of the tension pulley 54 is laterally adjustable with respect to the tensioner arm 52.

With this pulley adjustment arrangement, a pulley gear assembly is formed that includes the tension pulley 54, the drop-off prevention plates 56, the pulley adjustment boss 84 and the pulley axle 86 as an integrated unit. This pulley gear assembly is attachable, detachable and adjustable relative to the tensioner arm 52 via the set screw 88.

Installation of the chain tensioner 12 will now be discussed. With the chain tensioner 12 having the above mentioned configuration, the chain tensioner 12 is installed on the rear hub axle 42 of the internal shift hub 34 by inserting the rear hub axle 42 through the non-circular axle mounting hole 70 of bicycle axle mounting portion 64 of the attachment bracket 50. The fixing nut 62 is then screwed onto the rear hub axle 42 of the internal shift hub 34 to retain the attachment bracket 50 on the rear hub axle 42. Next, the fixing screw 60 and the fixing nut 62 are used to attach the tensioner arm 52 to the arm attachment portion 66 of the attachment bracket 50, if not already done so. In other words, the tensioner arm 52 can be attached before or after the attachment bracket 50 is attached to the rear hub axle 42 of the internal shift hub 34. At this point, if not already done so, the tension pulley 54 and the drop-off prevention plates 56 are attached to the tensioner arm 52 using the pulley adjustment arrangement (e.g., the pulley adjustment boss 84, the pulley axle 86 and the set screw 88). Of course, the tension pulley 54 and the drop-off prevention plates 56 can be attached to the tensioner arm 52 before or after the attachment bracket 50 is attached to the rear hub axle 42 of the internal shift hub 34. Once the tension pulley 54 and the drop-off prevention plates 56 are attached to the tensioner arm 52, the angular relationship between the attachment bracket 50 and the tensioner arm 52 can be adjusted to apply the proper tension to the chain 30. The fixing screw 60 and the fixing nut 62 of the securing position adjustment mechanism 58 are tightened so that the tensioner arm 52 cannot move relative to the attachment bracket 50. The tension pulley 54 has a fixed rotational axis that remains at a fixed distance with respect to the bicycle axle mounting portion 64 of the attachment bracket 50 when the tensioner arm 52 is fixed with respect to the attachment bracket 50 in one of a plurality of the securing positions by the securing position adjustment mechanism 58.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle chain tensioner of the present invention. Accordingly, these terms, as utilized to describe the present invention should be interpreted relative to a bicycle equipped with the bicycle chain tensioner of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle chain tensioner comprising:
    a bracket having a bicycle axle mounting portion and an arm attachment portion, the bicycle axle mounting portion of the bracket being a separate axle mounting member from the arm attachment portion of the bracket with the separate axle mounting member being press fitted into an aperture in the arm attachment portion of the bracket, the bicycle axle mounting portion having an anti-rotation structure including a non-circular axle mounting hole such that the non-circular axle mounting hole prevents the bracket from rotating about a bicycle axle when the bracket is mounted to the bicycle axle;
    a tensioner arm adjustably secured to the arm attachment portion of the bracket;
    a securing position adjustment mechanism that selectively fixes the tensioner arm with respect to the bracket in one of a plurality of the securing positions; and
    a chain engaging member attached to the tensioner arm.

2. The bicycle chain tensioner as set forth in claim 1, wherein
    the securing position adjustment mechanism includes a fixing screw that is disposed in coaxial bores formed in the tensioner arm and the arm attachment portion of the bracket with the fixing screw defining an adjustment axis such that the tensioner arm is pivotally attached to the arm attachment portion of the bracket when the fixing screw is loosened and such that the tensioner arm is fixed to the arm attachment portion of the bracket in one of the securing positions.

3. The bicycle chain tensioner as set forth in claim 1, wherein
    at least one of the tensioner arm and the arm attachment portion of the bracket includes a ribbed surface that contacts the other of the tensioner arm and the arm attachment portion of the bracket.

4. The bicycle chain tensioner as set forth in claim 1, wherein
    the chain engaging member includes a pulley that is rotatably supported by the tensioner arm.

5. The bicycle chain tensioner as set forth in claim 4, wherein
    the chain engaging member further includes a pulley adjustment arrangement that adjustably connects the pulley to the tensioner arm to selectively hold the pulley at one of a plurality of lateral rotation positions such that a center rotational plane of the pulley is laterally adjustable with respect to the tensioner arm.

6. The bicycle chain tensioner as set forth in claim 4, wherein
    the chain engaging member further includes a pair of drop-off prevention plates disposed on opposite axial sides of the pulley.

7. The bicycle chain tensioner as set forth in claim 4, wherein
the pulley has a fixed rotational axis that remains at a fixed distance with respect to the bicycle axle mounting portion of the bracket when the tensioner arm is fixed with respect to the bracket in one of the plurality of the securing positions by the securing position adjustment mechanism.

* * * * *